J. W. CLOSE.
Manufacture of Railroad-Frog-Points.
No. 155,496. Patented Sept. 29, 1874.
Fig. 1.
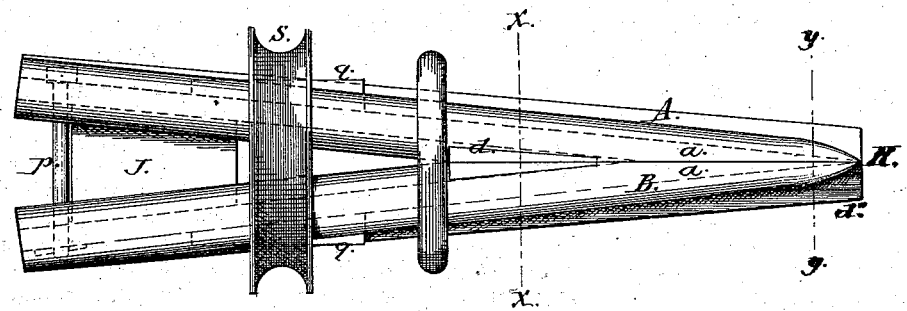
Fig. 2.
Fig. 4.
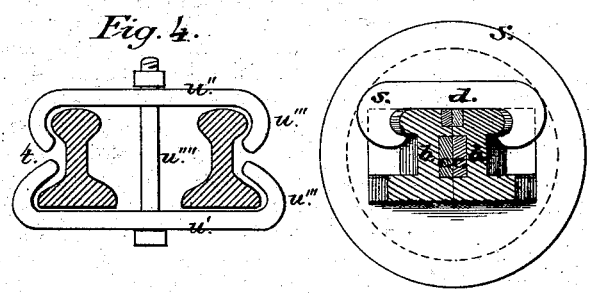
Fig. 6.
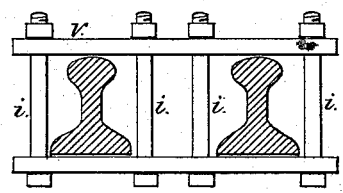
Fig. 5.
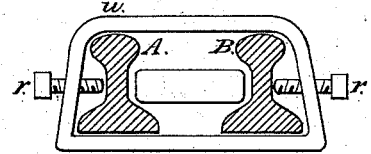
Fig. 3.
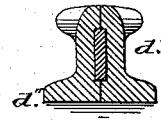
Fig. 7.
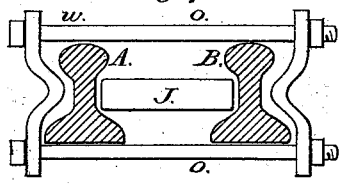
Witnesses:
Inventor:
John W. Close

UNITED STATES PATENT OFFICE.

JOHN W. CLOSE, OF BUFFALO, NEW YORK, ASSIGNOR OF ONE-HALF HIS RIGHT TO CHARLES B. SMITH, OF SAME PLACE.

IMPROVEMENT IN THE MANUFACTURE OF RAILROAD-FROG POINTS.

Specification forming part of Letters Patent No. 155,496, dated September 29, 1874; application filed March 6, 1874.

*To all whom it may concern:*

Be it known that I, JOHN W. CLOSE, of the city of Buffalo, in the county of Erie and State of New York, have invented certain new and useful Improvements in Welding or Forming the Joints for Railroad Frogs and Crossings; and I do hereby declare the following to be a full, clear, and exact description of the invention, such as will enable others skilled in the art to which it pertains to make and use it, reference being had to the accompanying drawings, which form part of this specification.

The object which my invention has in view is to weld together the ends of cast-steel rails, where they are placed together to form the points of railway-frogs. My invention consists in forming these points of cast-steel rails welded together. This is done by scarfing the ends of the cast-steel rails to be joined at the proper angle to form the point, and filling the channels in the scarfed side of each rail between the head and flange with wrought-iron or soft-steel filling. The rails are then placed together at the proper angle, the filling in one against the filling in the other, and secured by means of bolts, clamps, and wedges. In this state the point is heated and welded into a solid mass, the filling welding into a core which is blended under the hammer, with the two rails forming the point.

Figure 1 is a plan of the frog-point, secured in the sheave and prepared for welding. Fig. 2 is a section through line $x\,x$. Figs. 4, 5, 6, and 7 represent the clamps used for securing the rails together previous to welding. Fig. 3 is a section of the point through line $y\,y$.

H represents a frog-point made of two cast-steel rails, A and B, secured together and prepared to be welded. The sides of these rails, where they come in contact, are cut away or scarfed, as at $a\,a$, in order that they may be placed together at the proper angle. $b\,b$ are the channels in the sides of the rails between the head and flange. Owing to the angle at which the scarfing is cut these channels decrease in depth as they approach the extremity of the point. Wrought-iron or soft steel is placed in the channels as far as they extend in the scarfing. This filling is shown at $c\,c$ in Fig. 2. When the size of the space between the rails is known, a single piece of filling may be used of the requisite size and shape. The former method is preferable, however.

The rails being prepared as above set forth, are placed together at the proper angle and securely clamped. The point is then heated and forged. The iron filling in the channels, being iron to iron, readily consolidates, and welds to the rails A and B. This forms a core which connects the two rails together the full length of the scarfing, binding them to one another firmly and solidly.

To increase the security and compactness of the joint the core or filling is built out back of the scarfing, as at $d$. This is built from the flange to the head of the rails, and is then continued down the channel between the heads above the scarfing toward the extremity of the point. This mass of iron is welded to the rails either at the same time with the inner core, or under a separate heat for the special purpose. This device contributes greatly to the strength and efficiency of the joint, as by means of it rails A and B are connected together back of the scarfing by a solid mass of wrought-iron or soft steel, forming a connecting-band the full height of the rails, and completely filling the interstices between the heads of the same, binding the rails together securely, and giving an even surface to the top of the point, as shown in Figs. 1 and 2.

To give a solid extremity to the point, a thin piece of wrought-iron or soft steel is inserted between the rails A and B, at $d'$, and another piece is placed under their flanges at $d''$, and welded to their respective places. These devices solidify the extremity of the point, and prevent the rails from splitting apart. They may, however, be omitted, and the two rails welded to each other, if desirable.

By the method here described a solid railway-frog point is made of cast-steel rails, joined together by a substance not easily broken, without the use of bolts or plates. By the compactness of its construction it is enabled to withstand the shocks of passing wheels, and to endure for a great length of time without need of repair.

To secure the point while being welded has been found difficult; but this defect I have remedied by means of two devices, which I will now describe. The first consists of a combined sheave and clamp, and the second of a series of clamps used with a common crane. The former of these is clearly represented in Fig. 1, where the point H is shown secured ready for welding. After the rails A and B are prepared, as above set forth, they are placed together and secured over the scarfing by means of the single clamp S clasping their heads together. The wedge J is then placed between the rails, its purpose being to keep them apart at the proper angle by preventing the pressure of the clamps from opening them at the scarfing. For this end its sides are made to diverge at an angle corresponding to the angle of the point. When the wedge is placed between the rails they are made to press against its sides by means of the bolt $p$ passing laterally through the rails, or by means of one of the double clamps, hereafter mentioned. The point is then placed within the sheave in the manner shown in Fig. 1, where it is secured by means of the wedges $q\ q$ driven between the sides of the sheave and the webs of the rails. The sheave S is connected with a crane in the usual manner, and with its aid the point is handled with perfect ease and security. The second device consists in substituting for the sheave any one or the other of the clamps represented by $t$, $u$, $v$, and $w$, the point being secured by them, after it is prepared in the same way as before placing it in the sheave—that is, it is secured over the scarfing by means of the single clamp S, and the wedge J is placed between the rails for the same purpose as before. $t$ is a double clamp, composed of the bottom piece $u'$, which clasps the flanges of the rails, and the top piece $u''$, which clasps the heads of the same. This clamp is placed upon the rails just back of the scarfing, as far as its hooked ends $u'''$ will permit it to go, where it is secured by vertical bolt $u''''$. It exerts both lateral and vertical pressure upon the rails. The band-clamp $v$ is similar to clamp $t$, having the same end in view. They are used interchangeably. Clamp $u$ is composed of bottom piece, on which the rails rest, and the top piece placed over the heads laterally, where they are secured by means of the vertical bolts $i\ i\ i$. The band-clamp $v$, before mentioned, has lateral bolts $r\ r$ to operate against the rails and confine them against the wedge. Clamp $w$ is still another form. It consists of two bent pieces placed vertically against the rails, and secured by horizontal bolts $o\ o$.

It is essential that the piece upon which the flanges of the rails rest should be perfectly straight and square, as any irregularity in this respect would allow the point to twist and thus ruin it. This applies to the sheave as well as the clamps.

In using these clamps any number can be employed, it being only necessary to choose those which will exert the proper vertical and lateral pressure, so that the point will be kept exactly in the proper line and angle. The chain of the crane is passed around the point after it is clamped, and in this manner it is handled while being welded.

Having thus described my invention, what I claim as new, and desire to secure by Letters Patent, is—

The method for forming railway-frog points of cast-steel rails by scarfing at the proper angle the ends of the rails to be joined, and filling the spaces and channels between the contiguous sides of the rails with a soft filling, and then welding the two rails together through the medium thereof, substantially as and for the purpose hereinbefore described and set forth.

In testimony that I claim the foregoing I have hereunto set my hand this 17th day of February, 1874.

JOHN W. CLOSE.

Witnesses:
WILTON C. DONN,
JOS. T. K. PLANT.